Dec. 23, 1930.  E. A. HOBART  1,786,242
COMPRESSOR
Filed Sept. 1, 1928   3 Sheets-Sheet 2

INVENTOR
Edward A. Hobart
BY Toulmin & Toulmin
ATTORNEY

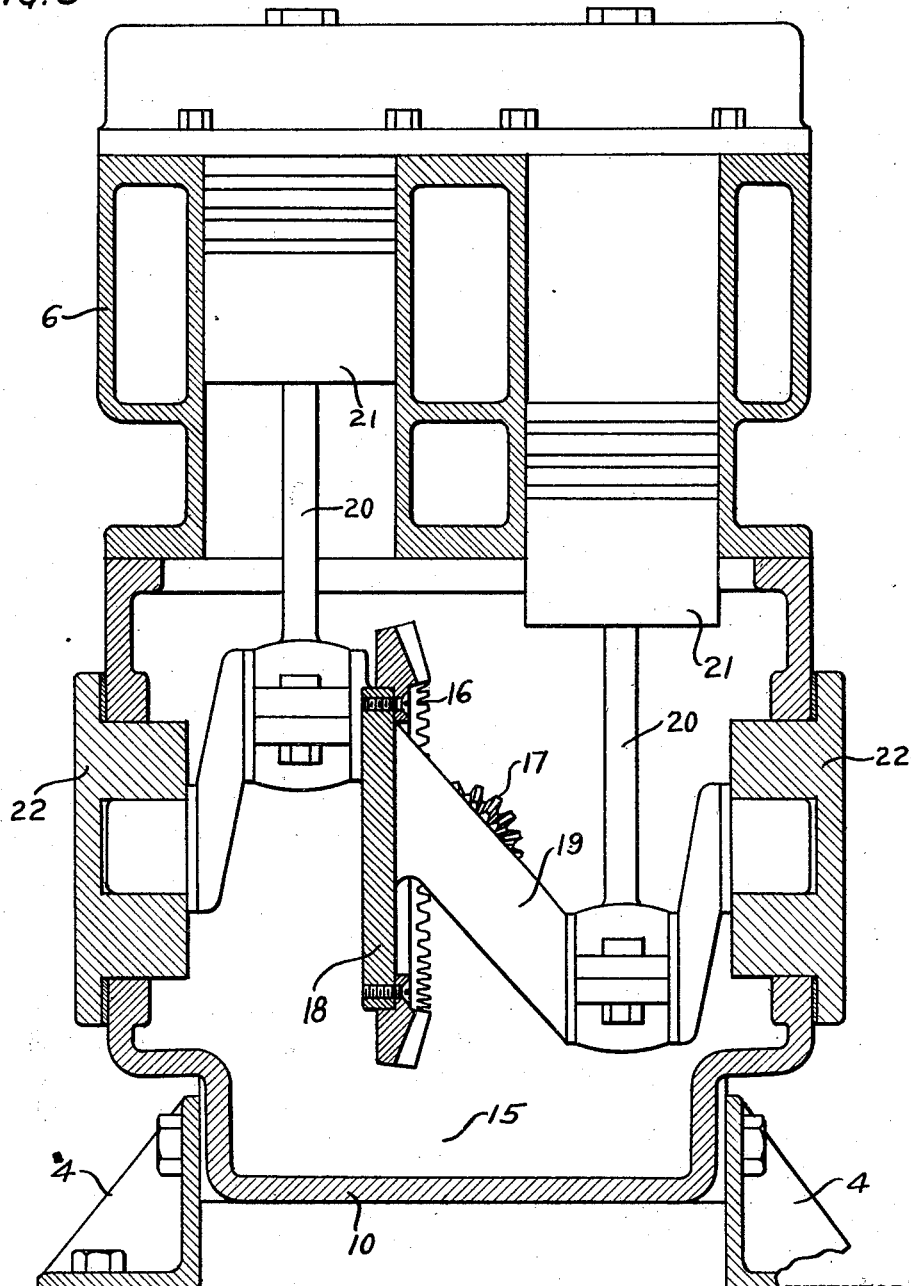

Patented Dec. 23, 1930

1,786,242

UNITED STATES PATENT OFFICE

EDWARD A. HOBART, OF TROY, OHIO, ASSIGNOR TO THE HOBART BROS. COMPANY, OF TROY, OHIO, A CORPORATION OF OHIO

COMPRESSOR

Application filed September 1, 1928. Serial No. 303,591.

My invention relates to compressors.

It is the object of my invention to provide a compressor which will eliminate belts, chains and other driving mechanism between the source of motive power and the compressor so as to provide a compact structure that can be mounted upon skids or a truck.

Such a portability is essential in connection with paint sprays and other similar apparatus with which portable compressors must be used.

It is a further object of my invention to provide a direct connection between the source of power and the compressor when using a gasoline engine that will permit of the gasoline engine starting and getting under way to speed without being stopped by the drag of the compressor.

It will be understood that the gas or gasoline engine is least effective upon its starting while the maximum power is required from the starting of the compressor due to its drag at the very time the engine has the least power to deliver.

Heretofore, it has been necessary to provide releases for the compressor, clutches between the engine and the compressor to allow easier starting and other expensive complications which add to the upkeep, initial expense and difficulties of operation as well as repair.

Such equipment makes it difficult to provide a self-contained portable unit and difficult to comply with State laws as to the concealment of exposed belts, chains, clutches and the like.

It is the object of my invention to provide a connection between the internal combustion engine and the compressor so that the engine is allowed to turn at a rapid speed while the compressor turns at a slow speed enabling the engine to be cranked, and to be spun rapidly while being cranked, with the minimum of drag from the compressor.

Furthermore, it is an object of my invention to provide the advantage of the compressor turning at slow speed where it is most effective while the internal combustion engine can turn at high speed, at which speed it is most effective.

For instance, I prefer the compressor to operate at from four hundred to five hundred revolutions per minute while the engine should run from twelve hundred to sixteen hundred revolutions per minute. If the compressor were running at such speeds as the engine, the difficulty with the compressor valves would be great.

It is a further object to eliminate awkward gearing and to provide means for constant self lubrication of the connection between the compressor and the source of motive power, the lubrication of the compressor cylinder and piston, the lubrication of the crank shaft of the engine and the crank shaft of the compressor so that a common reservoir of lubricant can be utilized for all purposes and such lubricant can be utilized by splash delivery of the oil to several places where it is to be used by the movement of the gearing through the lubricant connecting the engine and compressor.

Referring to the drawings:

Figure 3 is a vertical section on the line 3—3 of Figure 2 through the compressor.

Figure 1:
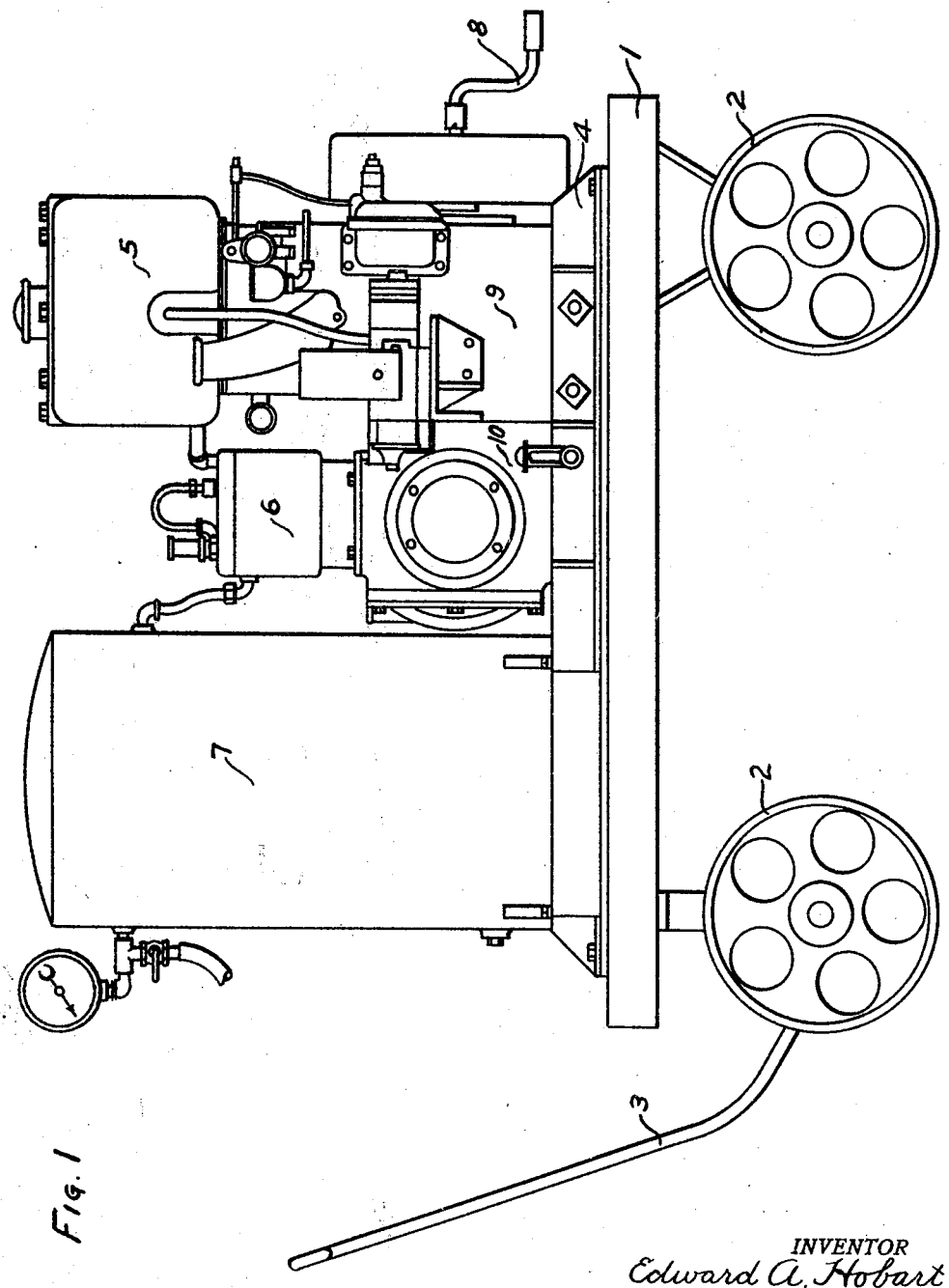
Figure 1 is a side elevation of the complete outfit mounted upon skids and the skids in turn mounted upon a portable truck.
Figure 2:
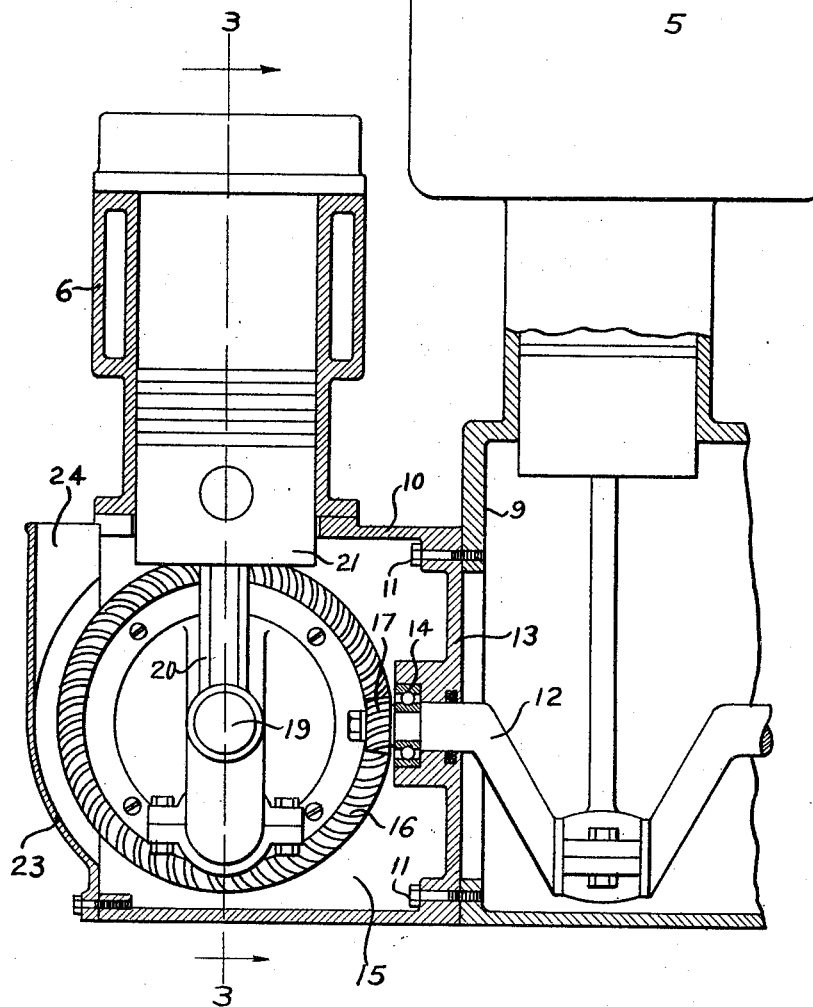
Figure 2 is a vertical section through the compressor and a portion of the internal combustion engine.

Referring to the drawings in detail, 1 designates the platform of a truck having wheels 2 and the handle 3. On the truck is mounted a pair of spaced side members 4 constituting skids upon which skids there is bolted or otherwise attached the internal combustion engine 5, the compressor 6 and the air tank 7. By placing the entire equipment on the truck ready accessibility at a convenient height may be had. 8 is the cranking handle attached to the internal combustion engine. The crank case of this engine, designated 9, is bolted to the crank case of the compressor, designated 10, by the bolts 11. 12 designates the crank shaft of the internal combustion engine, such crank shaft being supported at one end in its own crank case and at the other end in the end wall 13 of the crank case 10 of the compressor. It is supported in such crank case 13 by the ball bearing 14 which is lubricated from the lubricant in the reservoir 15 within the crank case of the compressor 10. This lubricant is splashed by the spiral bevel gear 16 which engages with the spiral bevel pinion 17. This pinion is in turn mounted upon the crank 12 of the internal combustion engine. The gear 16, as will be seen in Figure 3, is mounted upon a concentric disk 18 on the compressor crank shaft 19 which carries the piston rods 20 and pistons 21. This crank shaft is mounted within the bearing blocks 22 mounted in the sides of the compressor crank case 10 so that they are fed by the splash from the lubricant in the reservoir 15 in the bottom of the crank case.

It will be noted that the crank shaft 19 is mounted at right angles to the crank shaft 12 of the internal combustion engine and it will be further noted that the crank case 10 of the compressor is provided with the detachable end wall 23 that is provided with an upper open end 34 for the insertion of lubricant.

It will be understood that I desire to comprehend within my invention such modifications as may be necessary to adapt it to varying conditions and uses.

Having thus fully described my invention, what I claim as new and desire to secure by Letters Patent, is:

1. In combination, an internal combustion engine, a compressor, means of connecting the crank shaft of the engine to the crank shaft of the compressor, including a spiral bevel gear and pinion respectively mounted on the crank shafts of said compressor and engine, the crank shaft of the engine being located at right angles to the crank shaft of the compressor and a common support for the engine and compressor.

2. In combination, an internal combustion engine having a piston, cylinder, piston rod and crank shaft, such crank shaft being supported at one end by one wall of the engine, a compressor having a compressor crank shaft supported by the walls thereof, the other end of the crank shaft of the internal combustion engine being supported by one wall of the compressor, and means interconnecting the crank shafts and common means for independently supporting the engine and the compressor.

3. In combination, an internal combustion engine having a crank case and a crank shaft operating therein, one end of which is supported in one wall of the crank case, a compressor having a crank casing attached to the other wall of the crank case of the engine supporting the other end of the crank shaft, a bearing in said wall for supporting said crank shaft and lubricating it from the crank case of the compressor, a spiral bevel pinion on said crank shaft located within the crank case of the compressor, a crank shaft supported in the walls of the crank case of the compressor and lubricated therefrom, a spiral bevel gear mounted on said crank shaft meshing with said spiral bevel pinion and splashing lubricant to the engine crank shaft, bearing, compressor crank shaft bearings, and gear connection between the crank shafts and the piston of the compressor.

4. In combination, an internal combustion engine having a crank shaft, a compressor having a crank shaft, a spiral bevel pinion on the end of the engine crank shaft, a concentric disk on the compressor crank shaft, a spiral bevel gear mounted on said disk engaging with said spiral bevel pinion whereby the movement of the engine crank shaft will actuate the compressor crank shaft and a common means for independently supporting the engine and the compressor.

5. In combination, an internal combustion engine having a crank casing closed at one end and open at the other, a crank shaft projecting through the open end of the crank case, a compressor and compressor crank case adapted to close the open end of the engine crank case, said wall of the compressor crank case so closing the opening adapted to close the projecting end of the compressor crank shaft, a bearing in said wall for said crank shaft, a pinion closely adjacent to said pinion bearing mounted on said crank shaft, a bevel gear engaging therewith at right angles thereto, a transverse compressor crank shaft journaled in the walls of the compressor crank case carrying said bevel gear and a detachable end wall for said compressor crank case having an oil filling opening therein.

In testimony whereof I affix my signature.

EDWARD A. HOBART.